US012617373B2

(12) United States Patent
Farine

(10) Patent No.: US 12,617,373 B2
(45) Date of Patent: May 5, 2026

(54) INITIATING UWB COMMUNICATION BETWEEN VEHICLE SYSTEM AND PORTABLE IDENTIFIER

(71) Applicant: VALEO COMFORT AND DRIVING ASSISTANCE, Créteil (FR)

(72) Inventor: Herve Farine, Créteil (FR)

(73) Assignee: VALEO COMFORT AND DRIVING ASSISTANCE, Créteil (FR)

( * ) Notice: Subject to any disclaimer, the term of this patent is extended or adjusted under 35 U.S.C. 154(b) by 0 days.

(21) Appl. No.: 18/804,138

(22) Filed: Aug. 14, 2024

(65) Prior Publication Data

US 2025/0074360 A1 Mar. 6, 2025

(51) Int. Cl.
| | |
|---|---|
| *B60R 25/31* | (2013.01) |
| *G06K 7/10* | (2006.01) |
| *H04B 1/7163* | (2011.01) |

(52) U.S. Cl.
CPC .......... *B60R 25/31* (2013.01); *G06K 7/10306* (2013.01); *H04B 1/71632* (2013.01); *B60R 2325/101* (2013.01); *H04B 2201/71634* (2013.01)

(58) Field of Classification Search
CPC .............. B60R 25/31; B60R 2325/101; G06K 7/10306; H04B 1/71632; H04B 2201/71634
See application file for complete search history.

(56) References Cited

U.S. PATENT DOCUMENTS

| | | | | |
|---|---|---|---|---|
| 10,311,661 | B2 * | 6/2019 | Menard .................... | H04W 4/80 |
| 11,643,050 | B2 * | 5/2023 | Brückner .............. | H04W 4/023 |
| | | | | 340/5.61 |
| 2018/0099643 | A1 * | 4/2018 | Golsch .................. | G01S 13/765 |
| 2020/0198580 | A1 * | 6/2020 | Saleh ...................... | B60R 25/24 |
| 2021/0158637 | A1 * | 5/2021 | Kincaid .................... | G01S 5/12 |
| 2022/0371549 | A1 * | 11/2022 | Park ...................... | B60R 25/245 |
| 2023/0058744 | A1 * | 2/2023 | Lim ...................... | H04W 4/023 |
| 2023/0202430 | A1 * | 6/2023 | Yoshihara .............. | B60R 25/209 |
| | | | | 701/2 |
| 2024/0059249 | A1 * | 2/2024 | Ette ........................ | B60R 25/245 |

* cited by examiner

*Primary Examiner* — Thomas D Alunkal
(74) *Attorney, Agent, or Firm* — Osha Bergman Watanabe & Burton LLP

(57) ABSTRACT

A method for using a vehicle system that has stored a portable identifier is proposed. The system and the identifier are configured to communicate using a UWB communication protocol within a first perimeter around the vehicle and to communicate using a BLE communication protocol within a second perimeter that includes the first perimeter. The method comprises, while a user carrying the identifier is approaching the vehicle, detecting that the identifier is located within the second perimeter and performing two distance measurements between the user and the vehicle. The method then comprises determining a speed of the user and predicting a time remaining for the user to reach a predetermined near distance from the vehicle. After the predicted remaining time has elapsed, the method comprises initiating a communication using the UWB communication protocol. The method provides for improved use of the portable identifier.

9 Claims, 5 Drawing Sheets

[Fig. 1]
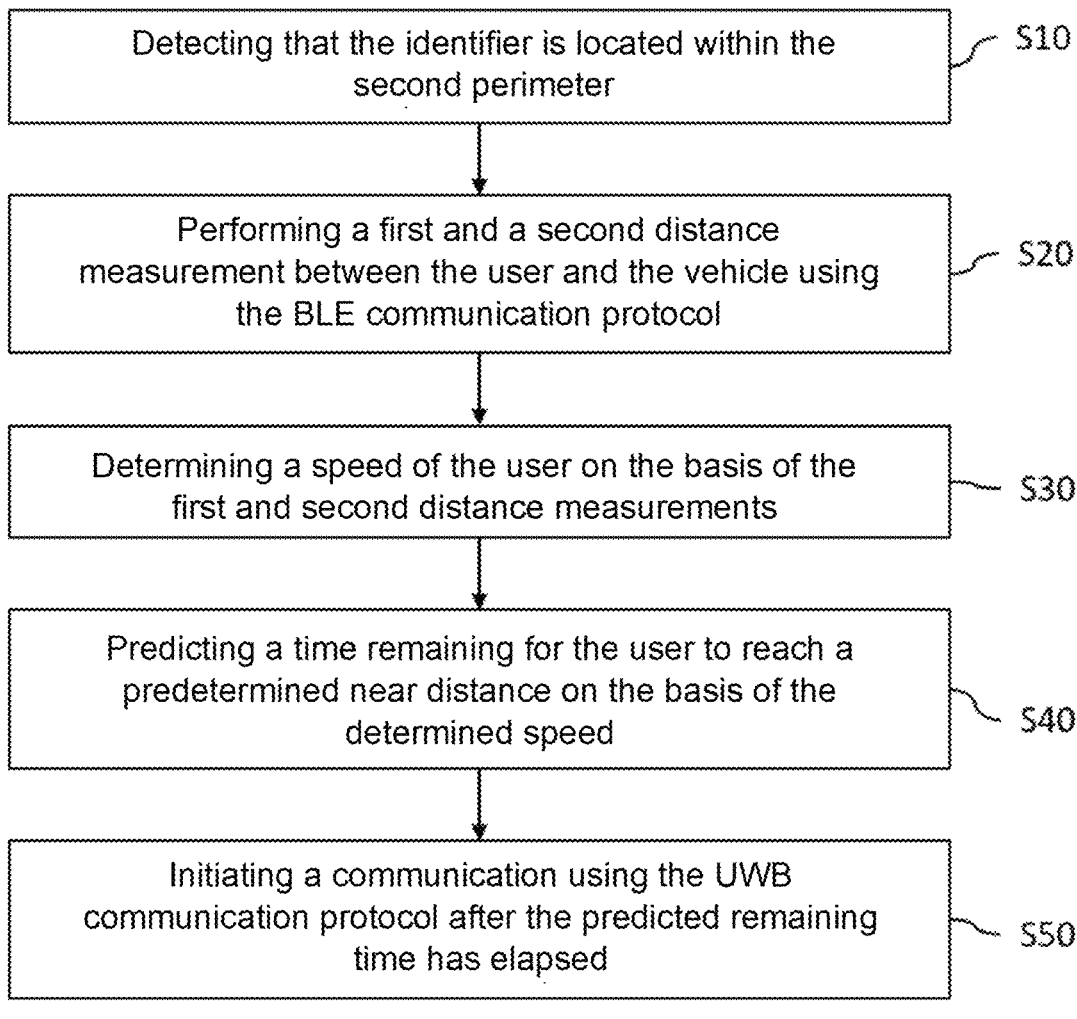

[Fig. 2]
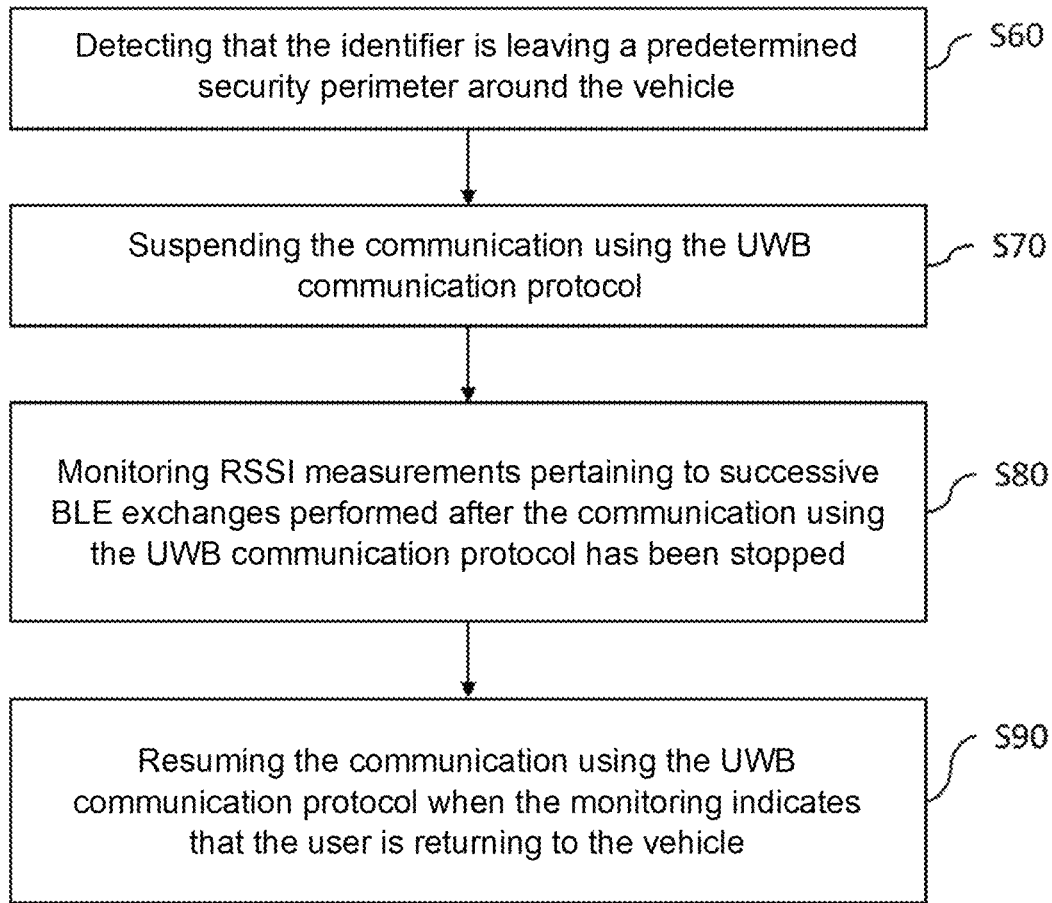

[Fig. 3]
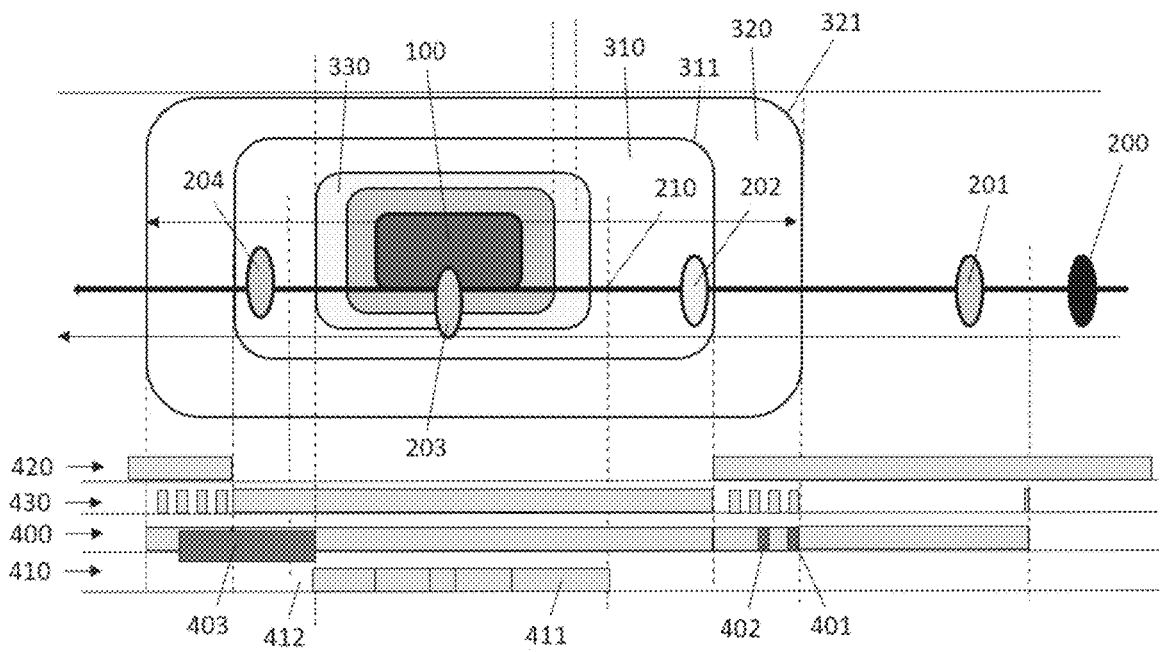

[Fig. 4]
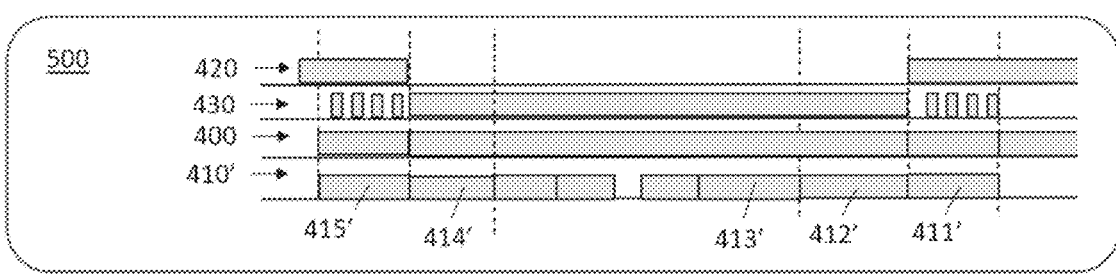
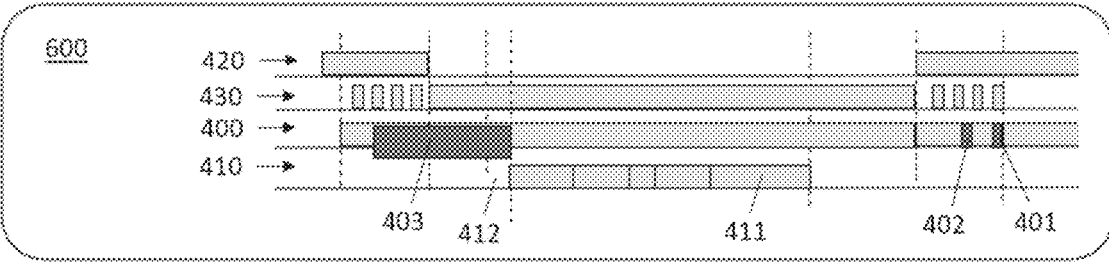

[Fig. 5]
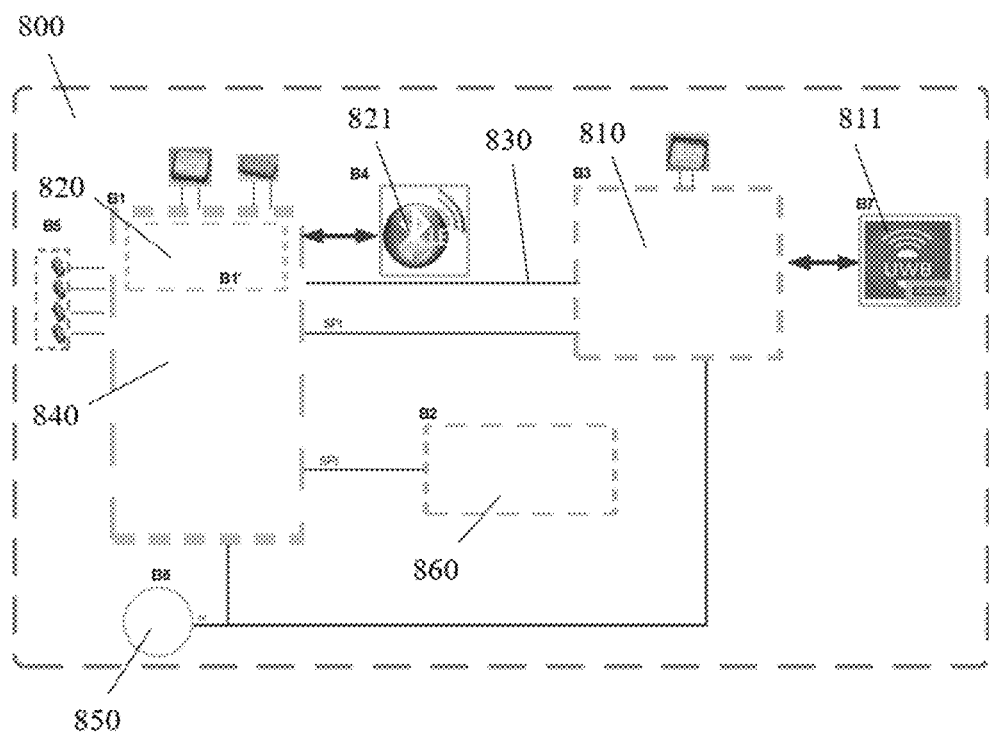

INITIATING UWB COMMUNICATION BETWEEN VEHICLE SYSTEM AND PORTABLE IDENTIFIER

TECHNICAL FIELD

The present disclosure relates to a method for using a vehicle system that has stored a portable identifier, a computer program for such a system and/or such a portable identifier, a storage medium for such a program, a portable identifier and a vehicle system.

TECHNICAL BACKGROUND

Today, there are vehicles equipped with systems that have stored one or more portable identifiers. These portable identifiers may be portable devices such as key fobs or smartphones. Each identifier comprises an electrical energy source (for example a cell) that allows it to be portable. Such systems allow the vehicle to perform functions, for example opening the doors and/or starting the vehicle, on the basis of the location of the one or more portable identifiers.

To perform these functions, each portable identifier may be configured to use one or more communication protocols to communicate with the system. For example, the portable identifier and the system may be configured to communicate using a UWB (Ultra-WideBand) communication protocol and a BLE (Bluetooth Low Energy) communication protocol. However, using these one or more communication protocols reduces the life of the portable identifier's electrical energy source.

In particular, BLE communication is used to ensure that the portable identifier is well away from the vehicle before a UWB communication is initiated. For this purpose, in existing solutions, BLE exchanges are performed between the system and the portable identifier while the user is approaching the vehicle. However, these BLE exchanges use up the life of the electrical energy source.

There is therefore a need to improve the use of such a system that has stored such a portable identifier.

SUMMARY

For this purpose, a method for using a vehicle system that has stored a portable identifier is proposed. The identifier comprises an electrical energy source. The system and the identifier are configured to communicate using a UWB communication protocol within a first perimeter around the vehicle and to communicate using a BLE communication protocol within a second perimeter around the vehicle. The second perimeter includes the first perimeter. The method comprises, while a user carrying the identifier is approaching the vehicle, the following five steps. The first step is detecting that the identifier is located within the second perimeter. The second step is performed after the detection and before the user reaches the first perimeter. The second step is performing a first and a second distance measurement between the user and the vehicle using the BLE communication protocol. The second measurement is performed after the first measurement. The third step is determining a speed of the user on the basis of the first and second distance measurements. The fourth step is predicting a time remaining for the user to reach a predetermined close distance from the vehicle on the basis of the determined speed. The fifth step is initiating a communication using the UWB communication protocol after the predicted remaining time has elapsed.

The prediction can comprise calculating a remaining distance between the distance measured by the second measurement and the predetermined near distance, and calculating the remaining time corresponding to the time for the user to cover the remaining distance taking into account the determined speed.

The method can comprise, after the user leaves the vehicle, the following four steps. The first step may be detecting (S60) that the identifier is leaving a predetermined security perimeter around the vehicle, the first perimeter including the predetermined security perimeter. The second step may be suspending (S70) the communication using the UWB communication protocol. The third step may be monitoring (S80) RSSI measurements pertaining to successive BLE exchanges performed after the communication using the UWB communication protocol has been stopped. The fifth step may be resuming (S90) the communication using the UWB communication protocol when the monitoring indicates that the user is returning to the vehicle.

The monitoring may indicate that the user is returning to the vehicle when one or more of the RSSI measurements pertaining to successive BLE exchanges are greater than one or more RSSI measurements pertaining to previous BLE exchanges.

The monitored successive BLE exchanges can comprise all BLE exchanges between the system and the identifier.

The identifier can comprise a microcontroller, a BLE component and a UWB component. The initiation of the communication can comprise the microcontroller sending a wake-up signal to the UWB component. The BLE component may optionally be integrated in the microcontroller.

The electrical energy source may be a cell, preferably a button cell and/or having a diameter of less than 25 millimetres and/or a height of less than 8 millimetres, for example less than 6 millimetres.

A first computer program for such a portable identifier is also proposed. The computer program comprises instructions that, when the program is executed by a processor of the portable identifier, cause said processor to carry out one or more of the steps (for example all the steps) of such a method.

A first computer-readable storage medium storing such a first computer program is also proposed.

A portable identifier is also proposed. The portable identifier comprises such a first storage medium. The portable identifier is configured to perform one or more of the steps (for example all the steps) of such a method.

A second computer program for such a vehicle system is also proposed. The computer program comprises instructions that, when the program is executed by a processor of the vehicle system, cause said processor to carry out one or more of the steps (for example all the steps) of such a method.

A second computer-readable storage medium storing such a second computer program is also proposed.

A vehicle system that has stored a portable identifier is also proposed. The vehicle system comprises such a second storage medium. The vehicle system is configured to perform one or more of the steps (for example all the steps) of such a method.

A vehicle system that has stored a portable identifier is also proposed. The vehicle system comprises such a second storage medium. The vehicle system is configured to perform one or more of the steps (for example all the steps) of such a method.

A third program comprising the first program and the second program is also proposed.

BRIEF DESCRIPTION OF THE FIGURES

Non-limiting examples will be described with reference to the following figures:

FIG. 1 and FIG. 2 show flowcharts of examples of the method.

FIG. 3 illustrates an example of the use of the vehicle system according to the method.

FIG. 4 illustrates a comparison of an example of the use of the vehicle system according to the method with the use of the system according to an existing solution.

FIG. 5 illustrates an exemplary architecture of the portable identifier.

DETAILED DESCRIPTION

With reference to the flowchart of FIG. 1, a method for using a vehicle system that has stored a portable identifier is proposed. The identifier comprises an electrical energy source. The system and the identifier are configured to communicate using a UWB communication protocol within a first perimeter around the vehicle and to communicate using a BLE communication protocol within a second perimeter around the vehicle. The second perimeter includes the first perimeter. The method comprises, while a user carrying the identifier is approaching the vehicle, the following five steps. The first step S10 is detecting that the identifier is located within the second perimeter. The second step S20 is performed after the detection S10 and before the user reaches the first perimeter. The second step S20 is performing a first and a second distance measurement between the user and the vehicle using the BLE communication protocol. The second measurement is performed after the first measurement. The third step S30 is determining a speed of the user on the basis of the first and second distance measurements. The fourth step S40 is predicting a time remaining for the user to reach a predetermined near distance on the basis of the determined speed. The fifth step S50 is initiating a communication using the UWB communication protocol after the predicted remaining time has elapsed.

The method provides for improved use of the portable identifier.

This is because the method allows communication using the UWB communication protocol to be initiated only when the portable identifier is within the perimeter in which the UWB communication protocol can be used. This avoids having to make unsuccessful attempts to initiate UWB communication while the user is approaching the vehicle. The method therefore improves the life of the electrical energy source of the portable identifier.

In particular, the two distance measurements allow precise and reliable evaluation of the distance that remains for the user to cover in order to reach the predetermined near distance. They therefore allow estimation of the time that remains for the user to be within the first perimeter, in which a UWB communication can be initiated. The method uses this estimation, thereby avoiding the need to use other means to achieve this (such as BLE exchanges, which are used in existing solutions). In particular, the method allows these other means to be replaced by only two distance measurements. The method thus saves energy from the electrical energy source of the portable identifier.

In addition, the method can take into account the fact that the user can move at different speeds in order to approach the vehicle. For example, the user may run when it is raining or walk slowly when they are writing a message on their phone. Distance measurements allow these different speeds to be taken into account and the initiation to be adjusted accordingly. In each of these different situations, the method therefore allows the UWB communication to be initiated at the right time.

The vehicle system and the portable identifier are configured to communicate using the UWB (Ultra-WideBand) communication protocol and the BLE (Bluetooth Low Energy) communication protocol. For each protocol, communication is understood to mean exchanges, for example periodic exchanges, of signals between the portable identifier and the system of the vehicle according to the communication protocol.

In particular, the UWB communication protocol is used by the system and the portable identifier when the portable identifier is within the first perimeter around the vehicle, that is to say that exchanges using this UWB protocol (UWB exchanges) can be performed within this first perimeter. This first perimeter can comprise all positions that are at a distance from the vehicle system less than or equal to a first predetermined distance (for example 7 metres). On a 2D plane embodying the ground, this first perimeter may be represented by a circle centred on the vehicle and having a radius equal to the first predetermined distance.

The BLE communication protocol is used by the system and the portable identifier when the portable identifier is within the second perimeter around the vehicle, that is to say exchanges using this BLE protocol (BLE exchanges) can be performed within this second perimeter. This second perimeter can comprise all positions that are at a distance from the vehicle system less than or equal to a second predetermined distance (for example 40 metres). On the 2D plane embodying the ground, this second perimeter may, like the first perimeter, be represented by a circle centred on the vehicle and may itself have a radius equal to the second predetermined distance.

Steps S10 to S50 can be performed by the portable identifier or by the vehicle system. Alternatively, one or more steps may be performed by the portable identifier and one or more other steps may be performed by the vehicle system. In some examples, some steps may also be performed by both devices (portable identifier and vehicle system).

In some examples, the vehicle system may have stored multiple portable identifiers. In this case, when a user carrying one of these portable identifiers is approaching the vehicle, the steps of the method can be performed for this identifier. When another of the portable identifiers is approaching the vehicle (for example by being carried by the same user or by another user), the method can be repeated for this other identifier.

The method performs steps S10 to S50 while the user carrying the identifier is approaching the vehicle. For example, the method can perform steps S10 to S50 while the user is on a journey to their vehicle, that is to say from a place of stay (for example their home, their office, a hotel or a business such as a shop or a restaurant) to the vehicle. The method can perform these steps S10 to S50 after the portable identifier has been reactivated. For example, the method can perform these steps S10 to S50 once the portable identifier has been retrieved by the user, and the portable identifier has reactivated itself. This reactivation can be performed automatically by the portable identifier after motion is detected. While the user is making this journey to the vehicle, the portable identifier may initially be outside the second perimeter and may then enter the second perimeter at a given moment during the journey. At this moment, the method can perform step S10.

After the identifier has entered the first perimeter and after step S10 has been performed, the method can perform step S20. In particular, the method performs step S20 before the identifier has entered the first perimeter. During the journey by the user, the portable identifier successively enters the second perimeter and then the first perimeter (the second perimeter being wider and including the first perimeter). The method performs step S20 during the portion of the journey that is within the second perimeter and before the first perimeter is entered.

After step S20, the method performs steps S30 and S40 to predict the time remaining for the user to reach the predetermined near distance from the vehicle. Step S50 is performed by the method after the predicted remaining time has elapsed, that is to say at the moment at which the method predicts that the user is at the predetermined near distance from the vehicle.

In some examples, the method can be repeated for each journey to the vehicle. For example, the method can be repeated for each home—vehicle, work—vehicle, hotel—vehicle and/or business—vehicle journey made by the user carrying the portable identifier.

The detection S10 can be carried out at the moment at which the identifier enters the second perimeter, that is to say the BLE communication perimeter. The detection S10 can comprise a first BLE exchange between the vehicle system and the portable identifier being successful. This first BLE exchange can comprise the system sending a signal and then the identifier receiving this signal. Alternatively, the signal can be sent by the identifier and then received by the system. In some examples, the detection S10 can comprise multiple BLE exchanges between the identifier and the system being successful (the identifier was detected within the second perimeter only after these multiple BLE exchanges were successful). Performance of this or these first BLE exchange(s) between the identifier and the system may mean that the portable identifier is within the second perimeter, that is to say that it is within range of the system. Before this first BLE exchange is successful, fruitless exchange tests may have been performed (since the identifier was then not yet within the second perimeter).

The distance measurements can also be performed S20 on the basis of one or more BLE exchanges between the system and the identifier (for example one for each measurement). The first measurement can be performed after the detection S10. For example, the first measurement can be performed immediately after the detection S10 (that is to say on the basis of a BLE exchange performed just after the first exchange). Alternatively, the first measurement can be performed after a first predetermined time has elapsed since the detection S10 (for example greater than 1 second and/or less than 5 seconds, for example 3 seconds after the detection S10 that the identifier is within the first perimeter). The second measurement is itself performed after the first measurement. For example, the second measurement can be performed after a second predetermined time has elapsed since the first measurement (for example greater than 5 seconds and/or less than 20 seconds, for example 10 seconds after the first measurement).

The first and second distance measurements can be performed in any manner. For example, each measurement can be performed using "channel sounding" technology, which can be used in particular with Bluetooth 5 (for example nxp HADM). For example, each measurement can comprise a BLE exchange between the identifier and the system and a calculation of a time of flight between the identifier and the system during this BLE exchange. This time of flight may be the time taken by the signal exchanged during the BLE exchange to make the round-trip journey between the identifier and the system. The time of flight can be calculated by the identifier or the system, and can be produced in any way. For example, each measurement can comprise recordings of the times at which the exchanged signal is sent and received, and the calculation can be carried out by deducing the time taken by the signal to make the round-trip journey from these recordings. Each measurement can then comprise deducing the distance between the identifier and the system on the basis of this time of flight. For example, each measurement can comprise multiplying a speed of the signal by the calculated time of flight. The speed of the signal may, for example, be a predetermined and known speed for this type of signal (for example stored in the memory of the identifier or of the system).

The speed can be determined S30 by the identifier or by the system. The determination S30 can be based on the two distance measurements performed. The determination S30 can also be based on the time that elapsed between the two distance measurements (that is to say for example on the second predetermined time discussed hereinabove). The speed can be determined S30 on the basis that the user is advancing toward the vehicle in a straight line. For example, the determination S30 can comprise calculating the distance covered by the user between the two distance measurements (by subtracting the distances measured for the two measurements) and dividing this calculated covered distance by the time that elapsed between the two distance measurements (that is to say by the second predetermined time).

As with the determination S30, the prediction S40 can be performed by the identifier or by the system. In some examples, the predetermined near distance may be substantially equal to the radius of the first perimeter, that is to say that this distance may correspond to the maximum range (for example authorized in the regulations) for performing a UWB communication (for example 7 metres). The method thus ensures that the identifier is within the first perimeter before initiating the UWB communication (step S50). In other examples, the predetermined near distance may be less than this radius of the first perimeter. For example, the predetermined near distance may be less than 5 metres and/or greater than 1 metre (for example approximately equal to 3 metres). This further increases the energy saving from the energy source, as the UWB communication is initiated even later. Once the communication has been initiated, the method can comprise performing one or more functions on the basis of UWB exchanges of the initiated communication. These one or more functions can comprise remotely switching on the vehicle, for example as soon as the user is closer than the predetermined near distance. For example, the method can comprise switching on the vehicle when the user is within 4 metres of the vehicle. In this case, the predetermined near distance is greater than 4 metres.

The remaining time can be predicted S40 on the basis of the determined speed in any way. For example, the prediction S40 can comprise calculating a remaining distance for the user to cover in order to reach the predetermined near distance. For example, the prediction S40 can assume that the user is advancing toward the vehicle in a straight line, and can comprise calculating the remaining distance by subtracting the predetermined near distance from the distance measured during the second measurement. The prediction S40 can then comprise calculating the remaining time by dividing the remaining distance by the speed of the user determined in step S30.

As with the determination S30 and the prediction S40, the initiation can be performed by the identifier or by the system. The initiation S50 can comprise performing one or more UWB exchanges between the portable identifier and the system, in particular to allow negotiation of communication parameter(s) between the portable identifier and the system. The method can comprise waiting for the predicted remaining time to elapse before performing these one or more UWB exchanges. The wait can be produced on the basis of an internal (for example digital) clock of the identifier or of the system (which is the clock of the vehicle, for example). When the wait is produced on the basis of an internal clock of the system, the method can comprise the system sending a message to the identifier to tell it when to act. The wait can be produced on the basis of the second measurement.

The initiated UWB communication can continue, for example until the user enters the vehicle or switches on the vehicle (for example switches on the vehicle's engine). At this moment, the UWB communication may vary. For example, the initiated UWB communication can comprise periodic UWB exchanges. When the user enters the vehicle or switches on the vehicle, the frequency of these periodic UWB exchanges can decrease.

With reference to the flowchart of FIG. 2, steps S60 to S90 are now discussed. In some examples, the method can comprise these steps S60 to S90 after steps S10 to S50 have been performed, and in particular after the user has got into the vehicle and has completed the journey they wished to make with the vehicle (for example a home—work, home— hotel, home—business or vice versa journey), that is to say once they have arrived at their destination. The method performs steps S60 to S90 after the user leaves the vehicle. The method can perform steps S60 to S90 while the user is on a journey from the vehicle, that is to say from the vehicle to a place of stay (for example their home, their office, a hotel or a business such as a shop or restaurant), to the vehicle. This place of stay may be the same as during the outward journey, or else it may be another place of stay. As with steps S10 to S50, steps S60 to S90 can each be performed by the portable identifier, by the vehicle system or by both devices (portable identifier and vehicle system).

The identifier can be detected S60 to be leaving the predetermined security perimeter in any way. For example, the detection S60 can be based on distance measurements between the identifier and the system. Each distance measurement can be performed on the basis of a UWB exchange between the portable identifier and the system, and can comprise calculating a time of flight for a UWB signal to cover a round-trip distance between the identifier and the system. Such a measurement on the basis of a UWB exchange can comprise a distance and a position of the identifier around the vehicle. The detection S60 can comprise comparing the measured distance with a distance corresponding to a radius of the predetermined security perimeter. This distance may be specified in a manufacturer's standard. It may, for example, be less than 3 metres and/or greater than 1 metre, for example approximately 2 metres.

The UWB communication is suspended S70 after the identifier has been detected S60 to be leaving the predetermined security perimeter. For example, the suspension S70 can be performed just after the detection S60. The suspension S70 can comprise deprogramming UWB exchanges between the identifier and the system. The suspension S70 can also comprise putting the UWB component of the identifier into standby mode.

In some examples, the suspension S70 can also comprise storing the negotiated session parameters for the suspended UWB communication. Courtesy of this storage, the UWB communication can be resumed (in particular as in step S90) without renegotiating these session parameters, that is to say by using the session parameters that were stored during the suspension S70 and that will already have been negotiated during the initiation S50. This improves the efficiency of the method.

After the suspension S70, the method can comprise monitoring S80 the RSSI (Received Signal Strength Indication) measurements pertaining to the successive BLE exchanges. For example, the method can comprise performing successive BLE exchanges between the identifier and the system, and the monitoring S80 can comprise, for one or more of these BLE exchanges (for example for all of these BLE exchanges), measuring the RSSI amplitude of this BLE exchange. For example, the method can monitor BLE exchanges performed every X milliseconds, X being between 30 milliseconds and 500 milliseconds, for example approximately 300 milliseconds. The amplitude may be an amplitude measured on reception of the signal exchanged during that exchange. For example, the amplitude can be measured on reception of the signal at the portable identifier or on reception at the system. When the amplitude is measured by the system of the vehicle, said system may be configured to transmit it to the identifier.

Next, the monitoring can comprise, for each BLE exchange, comparing the amplitude measured for that exchange with the amplitudes measured for the previous BLE exchanges. In some examples, the monitoring can comprise, for each BLE exchange, comparing the amplitude measured for that exchange with the amplitudes measured for all previous BLE exchanges (for example with each or with an average of these amplitudes measured for the previous BLE exchanges). Alternatively, the method can only compare the measured amplitude with that (those) measured when the vehicle is locked (for example with a hysteresis in dB to take account of fluctuation inherent in BLE operation). After each comparison, the method can comprise storing the measured amplitude (this amplitude then being used for the comparison with the amplitude of the next signal).

When the result of the comparison is that the measured amplitude is less than the amplitudes measured for the previous BLE exchanges, the monitoring S80 can indicate that the user is still moving away from the vehicle. When the result of the comparison is that the measured amplitude is substantially equal to the amplitude of the last previous exchange(s), the monitoring S80 can indicate that the user is stationary. In this case, the method can continue the monitoring S80 on the next exchanges to determine whether or not the user is turning back to the vehicle.

When the result of the comparison is that the measured amplitude is greater than the amplitudes measured for the previous BLE exchanges, the monitoring S80 can indicate that the user is returning to the vehicle. In this case, the method comprises resuming (S90) the communication using the UWB communication protocol. The resumption S90 can be performed using the session parameters that were stored during the suspension S70 and that will already have been negotiated during the initiation S50, that is to say without renegotiating these parameters. The resumption S90 can comprise UWB exchanges between the identifier and the system using these already negotiated session parameters. These UWB exchanges can, for example, allow distance measurements between the identifier and the system. The method thus allows the UWB communication to be suspended and to be resumed only when the user returns to the vehicle, which helps to improve the saving of the energy source of the portable identifier.

Some examples will now be described with reference to FIGS. 3 to 5.

FIG. 3 illustrates an example of the use of the vehicle system according to the method. The figure shows the vehicle system 100 that has stored the portable identifier 200, 201, 202 carried by the user. The system 100 and the identifier 200 are configured to communicate using a UWB communication protocol within a first perimeter 310 around the vehicle 100 and to communicate using a BLE communication protocol within a second perimeter 320 around the vehicle. The figure shows the limit 321 of the BLE connection and the limit 311 of the UWB connection. The perimeters 310, 320 are illustrated only schematically in the figure, and this illustration does not show the actual shape and scale of these perimeters. The second perimeter 320 includes the first perimeter 310.

The figure also shows the activities of the BLE component 400 and the UWB component 410 during performance of the method. The figure also shows the activities of the motion sensor 420 and the microcontroller 430.

The method comprises, while a user carrying the identifier is approaching the vehicle along the trajectory passing through the points 200, 201 and then 202, the following five steps. The first step S10 is detecting that the identifier is located within the second perimeter 320. The second step S20 is performed after the detection S10 and before the user reaches the first perimeter 320, that is to say before the point 202. The second step S20 is performing a first 401 and a second 402 distance measurement between the user and the vehicle 100 using the BLE communication protocol 400. The second measurement 402 is performed after the first measurement 401. The third step S30 is determining a speed of the user on the basis of the first 401 and second 402 distance measurements. The fourth step S40 is predicting a time remaining for the user to reach a predetermined near distance 210 on the basis of the determined speed. In this example, the predetermined near distance is a distance of 3 metres from the vehicle. The fifth step S50 is initiating a communication using the UWB communication protocol after the predicted remaining time has elapsed, that is to say at the moment for which it is predicted that the user will be at the distance 210. The initiation of the UWB communication comprises UWB exchanges 411 between the identifier and the vehicle.

The figure also illustrates steps S60 to S90 of the method, which are performed after the user leaves the vehicle. The method comprises detecting S60 that the identifier is leaving a predetermined security perimeter 330 around the vehicle. The first perimeter 310 includes this predetermined security perimeter 330. In this example, the predetermined security perimeter 330 comprises all positions situated less than 2 metres from the vehicle. After the detection S60, the method comprises suspending S70 the communication using the UWB communication protocol. The suspension S70 comprises halting 412 the UWB exchanges 411.

The method then comprises monitoring S80 RSSI measurements pertaining to successive BLE exchanges 403 performed after the communication using the UWB communication protocol has been stopped. The resumption S90 is not illustrated in the figure because the user continues to move away from the vehicle in this example. In other examples, during this monitoring S80, the user may decide to return to the vehicle. For example, at the position 204, the user can begin to return to the vehicle 100. The monitoring S80 will then indicate that the user is now returning to the vehicle. For example, the monitoring can indicate that the user is returning to the vehicle when the RSSI measurements pertaining to the successive BLE exchanges 403 increase. At this moment, the method can comprise resuming S90 the communication using the UWB communication protocol.

FIG. 4 illustrates a comparison of an example of the use 600 of the vehicle system according to the method with the use 500 of the system according to an existing solution. The figure shows that in the existing solution 500 the UWB component has to perform UWB communication initiation tests 411' as soon as the identifier enters the second perimeter 320. This is because the existing solution 500 performs these tests 411' in order to determine the moment at which the identifier is within the first perimeter 310 (one of the tests 411' then being successful). In the method 600, these tests 411' are replaced by two distance measurements 401 and 402, thereby drastically reducing the use of the energy source of the battery. In particular, when the near distance is less than the radius of the first perimeter (as in the illustrated example), the method 600 further reduces the use of the battery, since it also avoids the first UWB exchange phase 412' of the existing solution 500.

When the user leaves the vehicle, the existing solution 500 comprises UWB exchanges while the user is within the first perimeter. The method 600 avoids these UWB exchanges 414', since it allows the UWB communication to be suspended as soon as the user leaves the security perimeter 412. This helps to improve the life of the energy source. On the other hand, the monitoring S80 using the BLE exchanges 403 avoids performing the UWB communication initiation tests 415' that are performed in the existing solution 500 when the identifier leaves the first perimeter 310, this also helping to improve the life of the energy source.

FIG. 5 illustrates an exemplary architecture 800 of the portable identifier. The architecture 800 comprises a UWB component 810, a BLE component 820, a microcontroller 840 incorporating the BLE component 820 and an internal communication 830 between the UWB component 810 and the BLE component 820 (via the microcontroller 840). The architecture 800 comprises a UWB antenna 811 connected to the UWB component 810. The architecture 800 comprises a BLE antenna 821 connected to the BLE component 820 (via the microcontroller 840). The internal communication 830 prevents the UWB component from incorporating a component for measuring time (for example a resonator). The architecture 800 comprises a motion sensor 860 connected to the microcontroller 840. The architecture 800 comprises a cell 850 supplying power to the UWB component 810 and the microcontroller 840. After the prediction S40, the method comprises initiating S50 the UWB communication. The initiation S50 comprises the microcontroller 840 sending a wake-up signal to the UWB component 810 using the internal communication 830. After receiving the wake-up signal, the UWB component 810 can start up by being supplied with power from the electrical energy source 850 of the device. The method prevents the UWB component S810 from switching on while the user is not within the first perimeter, which reduces the risk of unnecessarily using up the electrical energy source 850.

The invention claimed is:

1. A method for using a vehicle system that has stored a portable identifier, the portable identifier comprising an electrical energy source, the vehicle system and the portable identifier being configured to communicate using an Ultra-WideBand (UWB) communication protocol within a first perimeter around a vehicle and to communicate using a Bluetooth Low Energy (BLE) communication protocol within a second perimeter around the vehicle, the second perimeter including the first perimeter, the method comprising, while a user carrying the portable identifier is approaching the vehicle:

detecting that the portable identifier is located within the second perimeter;

performing, after the detection and before the user reaches the first perimeter, a first and a second distance measurement between the user and the vehicle using the BLE communication protocol, the second measurement being performed after the first measurement;

determining a speed of the user on a basis of the first and second distance measurements;

predicting a time remaining for the user to reach a predetermined near distance from the vehicle on the basis of the determined speed; and initiating a communication using the UWB communication protocol after the predicted remaining time has elapsed.

2. The method according to claim 1, wherein the prediction comprises:

calculating a remaining distance between the distance measured by the second measurement and the predetermined near distance; and calculating the remaining time corresponding to the time for the user to cover the remaining distance taking into account the determined speed.

3. The method according to claim 1, wherein the method comprises, after the user leaves the vehicle:

detecting that the portable identifier is leaving a predetermined security perimeter around the vehicle, the first perimeter including the predetermined security perimeter;

suspending the communication using the UWB communication protocol;

monitoring RSSI measurements pertaining to successive BLE exchanges performed after the communication using the UWB communication protocol has been stopped; and resuming the communication using the UWB communication protocol when the monitoring indicates that the user is returning to the vehicle.

4. The method according to claim 3, wherein the monitoring indicates that the user is returning to the vehicle when one or more of the RSSI measurements pertaining to successive BLE exchanges are greater than one or more RSSI measurements pertaining to previous BLE exchanges.

5. The method according to claim 3, wherein the monitored successive BLE exchanges comprise all BLE exchanges between the system and the portable identifier.

6. The method according to claim 1, wherein the portable identifier comprises a microcontroller, a BLE component and a UWB component, the initiation of the communication comprising the microcontroller sending a wake-up signal to the UWB component, the BLE component being integrated in the microcontroller.

7. The method according to claim 1, wherein the electrical energy source is a cell, a button cell and/or having a diameter of less than 25 millimetres and/or a height of less than 8 millimetres, for example less than 6 millimetres.

8. A non-transitory computer-readable storage medium storing a computer program for a portable identifier and/or vehicle system comprising instructions that, when the program is executed by a processor, cause the processor to carry out the method according to claim 1.

9. A portable identifier and/or vehicle system comprising the computer-readable storage medium according to claim 8, the portable identifier and/or the system being configured to carry out a method for using the vehicle system that has stored the portable identifier, the portable identifier comprising an electrical energy source, the vehicle system and the portable identifier being configured to communicate using an Ultra-WideBand (UWB) communication protocol within a first perimeter around a vehicle and to communicate using a Bluetooth Low Energy (BLE) communication protocol within a second perimeter around the vehicle, the second perimeter including the first perimeter, the method comprising, while a user carrying the portable identifier is approaching the vehicle:

detecting that the portable identifier is located within the second perimeter;

performing, after the detection and before the user reaches the first perimeter, a first and a second distance measurement between the user and the vehicle using the BLE communication protocol, the second measurement being performed after the first measurement;

determining a speed of the user on a basis of the first and second distance measurements;

predicting a time remaining for the user to reach a predetermined near distance from the vehicle on the basis of the determined speed; and initiating a communication using the UWB communication protocol after the predicted remaining time has elapsed.

* * * * *